(12) United States Patent
Morinaga et al.

(10) Patent No.: US 12,315,100 B2
(45) Date of Patent: May 27, 2025

(54) CONTROL APPARATUS, IMAGE PICKUP APPARATUS, AND CONTROL METHOD (71) Applicant: CANON KABUSHIKI KAISHA, Tokyo (JP)

(72) Inventors: Mizuki Morinaga, Kanagawa (JP); Ryosuke Tanaka, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 165 days.

(21) Appl. No.: 18/345,444

(22) Filed: Jun. 30, 2023

(65) Prior Publication Data
US 2024/0046592 A1 Feb. 8, 2024

(30) Foreign Application Priority Data

Aug. 8, 2022 (JP) .................... 2022-126633

(51) Int. Cl.
G06T 19/20 (2011.01)
H04N 23/67 (2023.01)

(52) U.S. Cl.
CPC .......... *G06T 19/20* (2013.01); *H04N 23/675* (2023.01); *G06T 2219/2004* (2013.01); *G06T 2219/2016* (2013.01)

(58) Field of Classification Search
None
See application file for complete search history.

(56) References Cited

U.S. PATENT DOCUMENTS

| | | | |
|---|---|---|---|
| 2007/0019940 A1* | 1/2007 | Sasaki | H04N 23/673 348/E5.045 |
| 2010/0045800 A1* | 2/2010 | Chebil | G06T 7/20 348/169 |
| 2010/0157127 A1* | 6/2010 | Takayanagi | H04N 23/63 348/E5.022 |
| 2023/0300460 A1* | 9/2023 | Saito | H04N 23/611 |
| 2024/0357062 A1* | 10/2024 | Niikawa | G08B 13/19684 |

FOREIGN PATENT DOCUMENTS

JP 2014-155173 A 8/2014

* cited by examiner

Primary Examiner — Nurun Flora
(74) Attorney, Agent, or Firm — Venable LLP (57) ABSTRACT A control apparatus of controlling imaging of an object includes a memory storing instructions, and a processor configured to execute the instructions to acquire information about three-dimensional space as an imaging target, dispose a virtual figure in the three-dimensional space, designate a search area to search the three-dimensional space for the object based on the virtual figure, and perform at least one of focus control and continuous imaging control for the object existing within the search area.

14 Claims, 9 Drawing Sheets

CONTROL APPARATUS, IMAGE PICKUP APPARATUS, AND CONTROL METHOD

BACKGROUND

Technical Field

One of the aspects of the embodiments relates to an image pickup apparatus that performs automatic imaging control (automatic image pickup control).

Description of Related Art

An automatic image pickup apparatus that automatically performs framing and imaging for an object without an operation of a user (user operation) is used for applications such as security cameras and imaging of wild animals. Such an automatic image pickup apparatus may have an imaging function reflecting the intention of the user, like an image pickup apparatus for normal use.

In technical fields such as Augmented Reality (AR) and Mixed Reality (MR), a combined image is generated by superimposing a virtual object on an image obtained by imaging real space. Japanese Patent Laid-Open No. 2014-155173 discloses an image pickup apparatus that disposes a virtual object as a three-dimensional figure in three-dimensional space and performs imaging when an object enters and exits the virtual object.

A problem in imaging by the user operation is that autofocus (AF) is not in time for a desired imaging timing, and an in-focus captured image cannot be obtained. In addition, continuous imaging of a moving object from the beginning to the end at a uniform interval (continuous imaging speed) provides a large amount of captured images, and requires the user to arduously select a necessary captured image from among them.

The image pickup apparatus disclosed in Japanese Patent Laid-Open No. 2014-155173 cannot set AF on an object entering and exiting a virtual object, a continuous imaging speed for a moving object, or the like. Thus, this image pickup apparatus has difficulty in imaging that reflects the intention of the user by definitely completing AF before imaging, and by properly controlling the continuous imaging speed and the number of captured images from the beginning to the end of continuous imaging.

SUMMARY

A control apparatus of controlling imaging of an object according to one aspect of the disclosure includes a memory storing instructions, and a processor configured to execute the instructions to acquire information about three-dimensional space as an imaging target, dispose a virtual figure in the three-dimensional space, designate a search area to search the three-dimensional space for the object based on the virtual figure, and perform at least one of focus control and continuous imaging control for the object existing within the search area. A control method corresponding to the control apparatus also constitutes another aspect of the disclosure.

Further features of the disclosure will become apparent from the following description of embodiments with reference to the attached drawings.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure.

An image pickup apparatus according to each embodiment recognizes three-dimensional space as an imaging target, and always acquires distance information and object shape information in the three-dimensional space during imaging. The image pickup apparatus disposes a virtual object for dividing the recognized three-dimensional space into a plurality of areas, and divides the imaging target space in the three-dimensional space into an attention area and a non-attention area. Thereby, AF and continuous imaging are performed only for an object existing in the attention area.

First Embodiment

Figure 1:
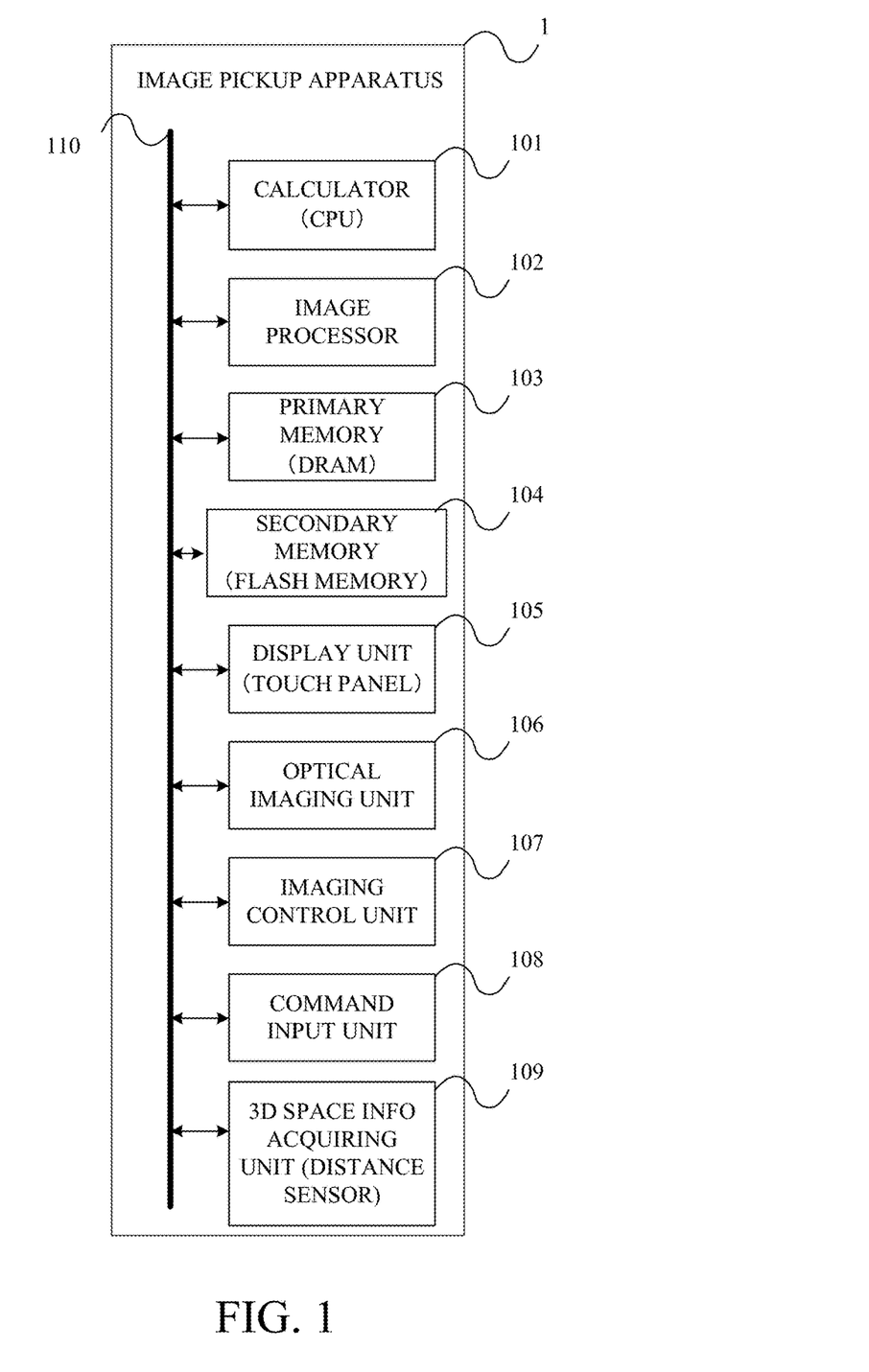
FIG. 1 is a block diagram illustrating a configuration of an image pickup apparatus according to a first embodiment.

FIG. 1 illustrates a hardware configuration of an image pickup apparatus according to a first embodiment. The image pickup apparatus 1 includes a calculator (calculating unit) 101, an image processor (image processing unit) 102, a primary memory 103, a secondary memory 104, a display unit 105, an optical imaging unit 106, an imaging control unit 107, a command input unit 108, and a three-dimensional (3D) space information acquiring unit 109. These components communicate data and control signals via a bus 110.

The calculator 101 includes a microcomputer such as a CPU, and controls each component and performs calculation processing of data. The image processor 102 generates an image from the imaging signal obtained by imaging by the optical imaging unit 106, displays the image on the display unit 105, and performs processing to associate a live-view (LV) image with distance information acquired by the three-dimensional space information acquiring unit 109. The image processor 102 also performs encoding processing for the generated image.

The primary memory 103 includes a storage element such as a DRAM, and temporarily stores data such as images processed by the image processor 102, and three-dimensional space information. The secondary memory 104 is a storage medium such as an SD card or flash memory, and stores a recording image processed by the image processor 102.

The display unit 105 displays LV images. The optical imaging unit 106 includes an optical system and an image sensor, converts light from an object (object image) into an electrical signal, and outputs an imaging signal. The imaging control unit 107 performs focus control (AF) and exposure control (auto-exposure (AE)) for the optical imaging unit 106, and performs imaging control such as continuous imaging. A control unit includes the calculator 101 and the imaging control unit 107. A control apparatus includes the control unit and an acquiring unit described below. The control apparatus includes a memory that stores instructions and a processor configured to execute instructions for various purposes.

The command input unit 108 as an operation unit includes an operation member such as a button, a dial, a switch, a joystick, and a touch panel, operable by the user to select a mode and set an imaging condition, and outputs a command in accordance with the user operation to the calculator 101 and the imaging control unit 107.

The three-dimensional space information acquiring unit 109 as an acquiring unit includes a distance sensor, GPS, or the like, and acquires information about three-dimensional space as the real space, that is, distance information and shape information in the three-dimensional space, and position (or location) information about the image pickup apparatus 1. In the following description, information about three-dimensional space will be referred to as three-dimensional space information. The distance sensor can use an image sensor that has a plurality of light receiving parts for each pixel and can detect a phase difference according to a distance, or an image sensor that can measure a distance by the Time of Flight (ToF) method. A distance sensor other than the imaging sensor may also be used.

Figure 2:
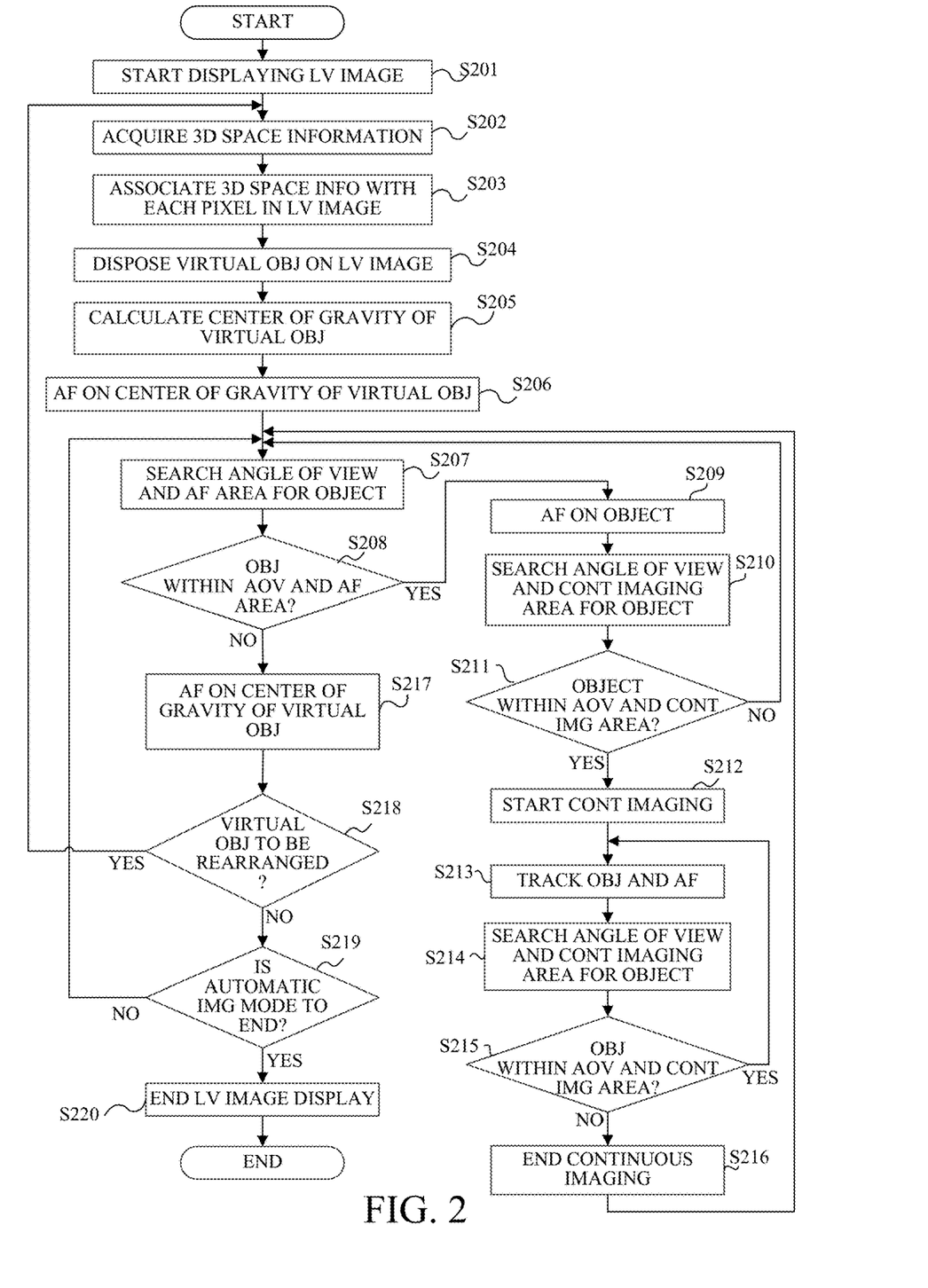
FIG. 2 is a flowchart illustrating automatic imaging processing according to the first embodiment.

A flowchart in FIG. 2 illustrates automatic imaging processing (imaging control method) executed by the calculator 101 according to a program. When the user operates a touch panel, a button, etc. of the command input unit 108 to switch the imaging mode to the automatic imaging mode, this flow starts.

In step S201, the calculator 101 causes the optical imaging unit 106 to start imaging for an LV image, causes the image processor 102 to generate the LV image, and causes the display unit 105 to start displaying the LV image.

Next, in step S202, the calculator 101 causes the three-dimensional space information acquiring unit 109 to acquire three-dimensional space information, such as distance information from the image pickup apparatus 1 to an object (object or background object) within an imaging angle of view, position information indicating the position of the image pickup apparatus 1, and the like. The calculator 101 causes the three-dimensional space information acquiring unit 109 to temporarily store the acquired three-dimensional space information in the primary memory 103.

Next, in step S203, the calculator 101 associates the three-dimensional space information acquired in step S202 with each pixel of the LV image. That is, the calculator 101 generates three-dimensional space information for each pixel of the LV image.

Figure 3:
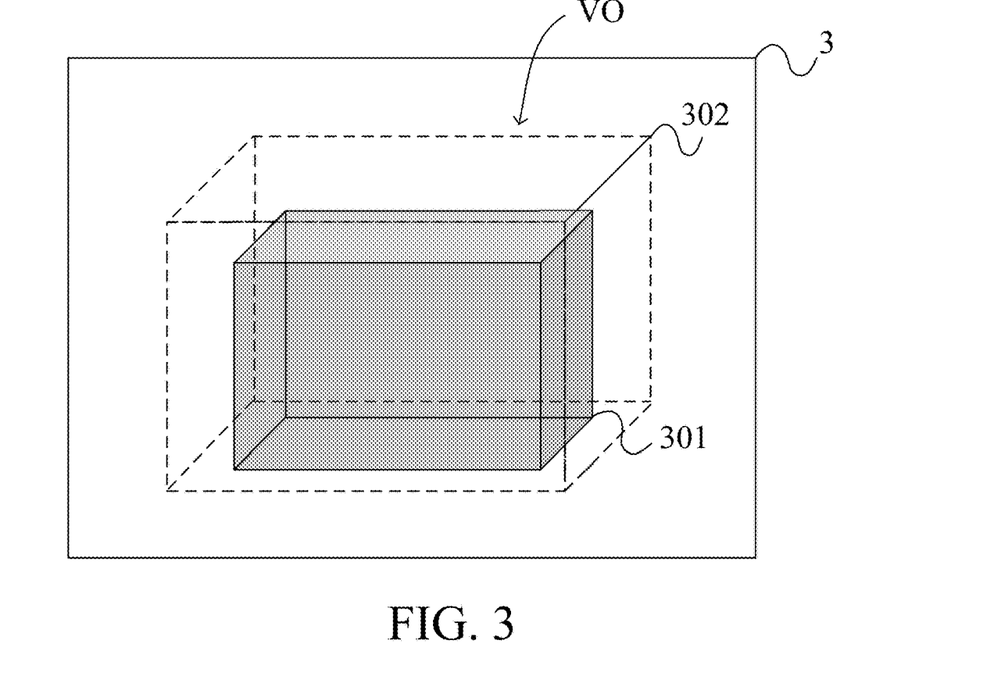
FIG. 3 illustrates a virtual object, an AF area, and a continuous imaging area arranged on a live-view image according to the first embodiment.
Figure 9:
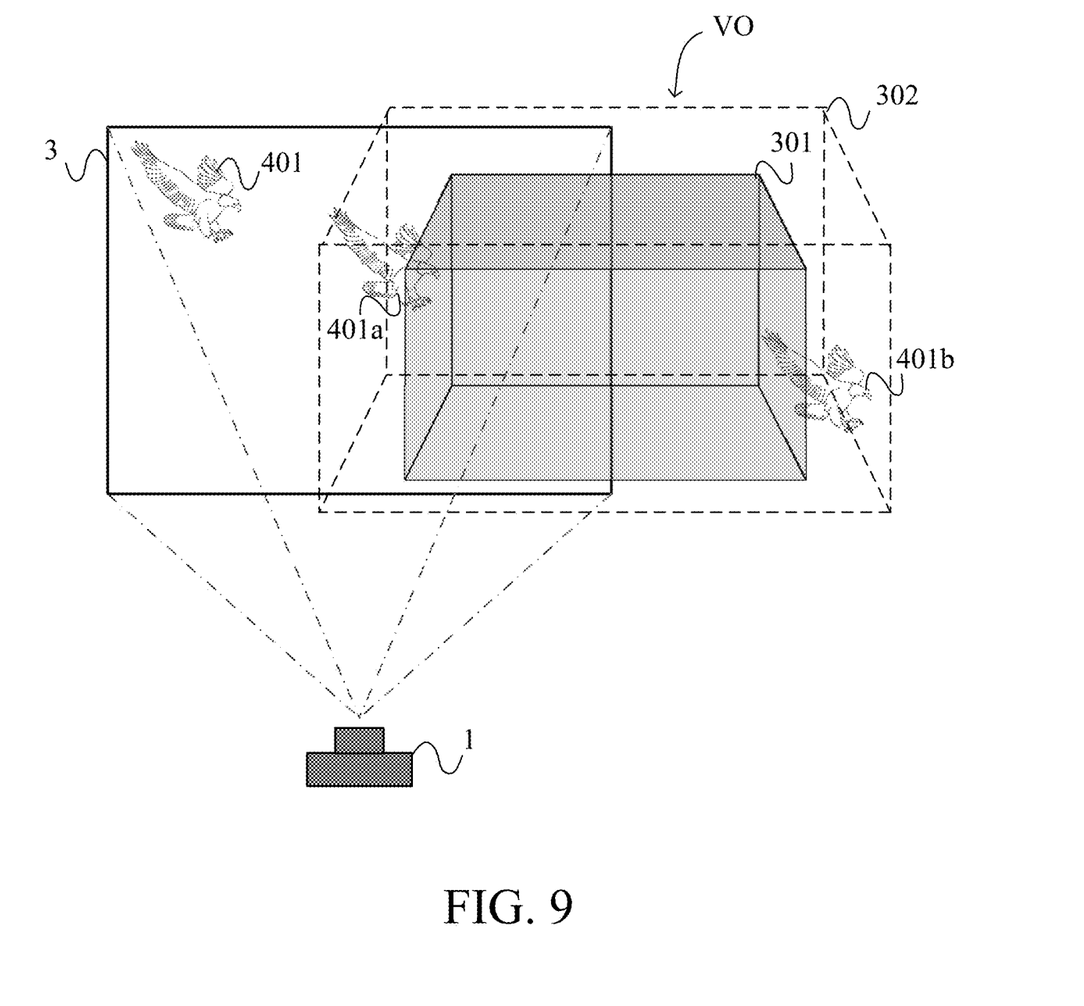
FIG. 9 illustrates that part of the AF area does not fall within the imaging angle of view in the first embodiment.

Next, in step S204, in accordance with the user operation of the touch panel or the like of the command input unit 108, the calculator 101 disposes a virtual object VO having a size in vertical, horizontal, and depth directions preset on the LV image 3 (that is, within the imaging angle of view) as illustrated in FIG. 3. The virtual object VO is a virtual three-dimensional figure, and has a rectangular parallelepiped shape in this embodiment. Such a virtual object VO is disposed, for example, so that the center of gravity of the virtual object VO is positioned at the touch position of the finger of the user on the touch panel. At this time, as illustrated in FIG. 9, the virtual object VO may be set so that part or all of it does not fall within the LV image 3. The virtual object VO is combined with the LV image by the image processor 102 and displayed on the display unit 105.

After the virtual object VO is disposed, the image processor 102 changes the size of VO according to a pinch operation with two fingers performed on the touch panel or a moving operation of a finger that has touched a side or vertex of the virtual object VO. The image processor 102 changes the position of the virtual object VO according to the moving operation of the finger that touches the surface of the virtual object VO on the touch panel. The image processor 102 changes the size of the virtual object VO in the depth direction according to the touching time period of the surface of the virtual object VO. The image processor 102 may change the arrangement, size, and position of the virtual object according to the user operation such as a button, a dial, a switch, and a joystick of the command input unit 108.

A virtual object VO is disposed to designate a search area for searching for an object and determining its existence. FIG. 3 illustrates the search area designated to entirely cover the inside of the virtual object VO. The search area includes a continuous imaging area 301 and an AF area (focus area) 302. The continuous imaging area 301 is an area in which the calculator 101 causes the imaging control unit 107 to perform continuous imaging control over the optical imaging unit 106 in a case where an object exists in the continuous imaging area 301. The user can arbitrarily set a continuous imaging interval (continuous imaging speed) in the continuous imaging control. The AF area 302 is an area in which the calculator 101 causes the imaging control unit 107 to perform the AF control (focus control) over the optical imaging unit 106 in a case where an object exists inside the AF area 302. In FIG. 3, the AF area 302 entirely covers the inside of the virtual object VO and the continuous imaging area 301 is set to part of (the inside of) the AF area 302.

The search area may be designated not only inside the virtual object VO but also outside the virtual object VO. For example, after a virtual object corresponding to a continuous imaging area is first disposed, a predetermined area outside the virtual object may be designated as the AF area. Alternatively, virtual objects designating the continuous imaging area and the AF area may be separately disposed. In FIG. 3, the continuous imaging area 301 is designated so that it is smaller than the AF area 302, but the continuous imaging area and the AF area may be designated so that they have the same size. While FIG. 3 illustrates that each of the virtual object VO, the continuous imaging area 301, and the AF area 302 has a rectangular parallelepiped shape, they may have another shape or a two-dimensional figure such as a plane, a line, and a point.

Next, in step S205, the calculator 101 calculates the coordinates of the center of gravity of the virtual object disposed in step S204.

Next, in step S206, the calculator 101 causes the imaging control unit 107 to perform the AF control over the optical imaging unit 106 so as to focus on the center of gravity of the virtual object calculated in step S205.

Next, in step S207, the calculator 101 causes the three-dimensional space information acquiring unit 109 to acquire three-dimensional space information within the imaging angle of view (LV image), and determines whether or not an object exists within the imaging angle of view and within the AF area. Here, the calculator 101 determines that the object exists within the imaging angle of view and within the AF area by determining that distance information corresponding to the coordinates in the AF area exists in the three-dimensional space information within the imaging angle of view acquired by the three-dimensional space information acquiring unit 109.

Figure 4:
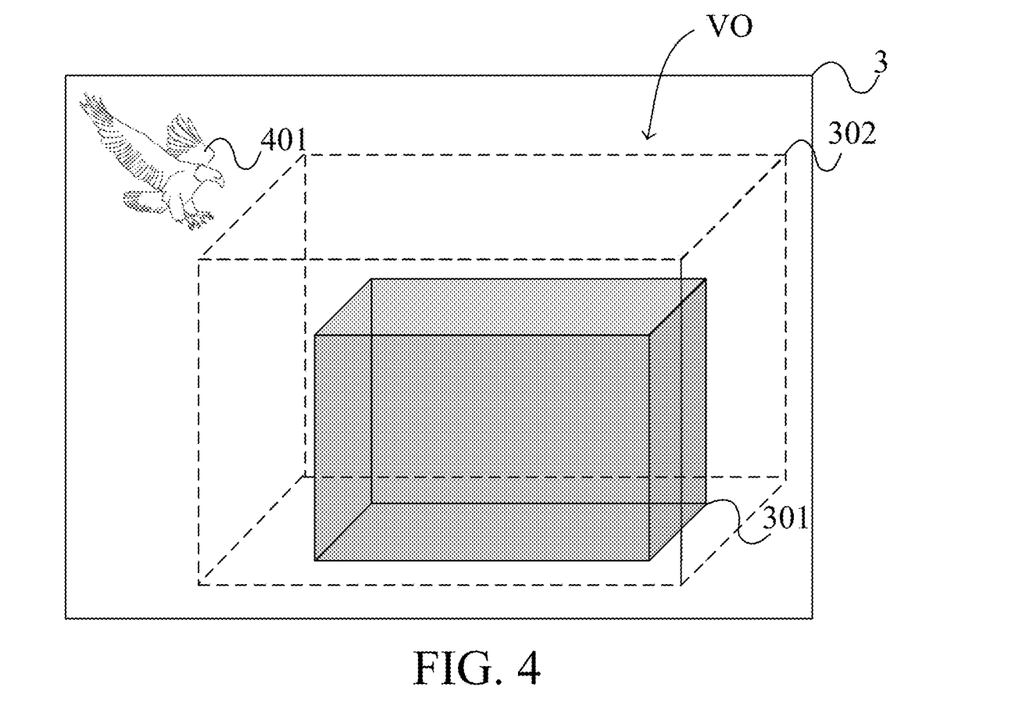
FIG. 4 illustrates an object that enters an imaging angle of view according to the first embodiment.
Figure 5:
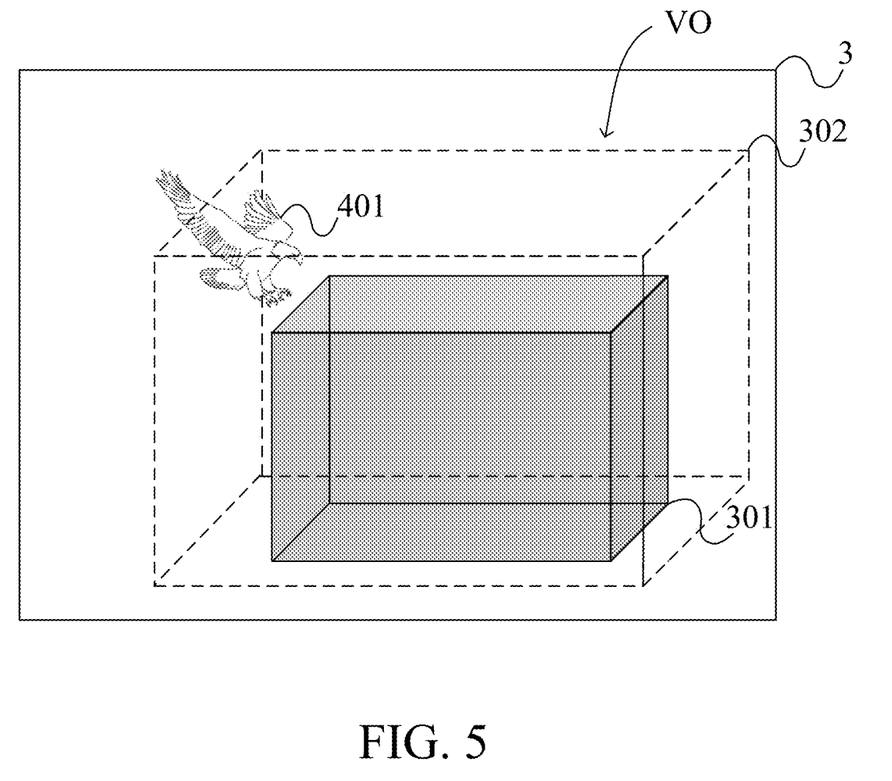
FIG. 5 illustrates an object entering the AF area according to the first embodiment.

FIG. 4 illustrates that an object (bird) 401 enters the LV image 3 including the continuous imaging area 301 and the AF area 302. In this case, since the object 401 is positioned outside the AF area 302, the three-dimensional space information acquired by the three-dimensional space information acquiring unit 109 does not include distance information corresponding to coordinates within the AF area. Therefore, the calculator 101 determines that the object exists within the imaging angle of view but not within the AF area. Thereafter, in a case where the object 401 moves and enters the AF area 302 as illustrated in FIG. 5, the three-dimensional space information acquiring unit 109 acquires distance information corresponding to the coordinates within the AF area. At this time, the calculator 101 determines that the object exists within the imaging angle of view and within the AF area.

In a case where part of the AF area 302 is not located within the LV image 3 as illustrated in FIG. 9, the calculator 101 determines that the object 401 exists within the imaging angle of view but does not exist within the AF area 302. The calculator 101 determines that an object 401a exists within the imaging angle of view and within the AF area 302. The calculator 101 determines that an object 401b exists within the AF area 302 but does not exist within the imaging angle of view. The calculator 101 determines that the object 401a will exist within the imaging angle of view and within the AF area by changing a direction of the image pickup apparatus 1 so that the AF area 302 falls within the LV image 3.

Next, in step S208, the calculator 101 proceeds to step S209 in a case where the calculator 101 determines in step S207 that the object exists within the imaging angle of view (AOV) and within the AF area. Otherwise, the flow proceeds to step S217.

In step S209, the calculator 101 causes the imaging control unit 107 to perform AF control over the optical imaging unit 106 so as to focus on an object within the imaging angle of view and within the AF area.

Next, in step S210, the calculator 101 causes the three-dimensional space information acquiring unit 109 to acquire the three-dimensional space information within the imaging angle of view, and determines whether or not an object exists within the imaging angle of view and within the continuous imaging area. Here, determination is made by a method in which the AF area in step S207 is replaced with a continuous imaging area.

Next, in step S211, in a case where the calculator 101 determines in step S210 that the object exists within the imaging angle of view and within the continuous imaging area, the flow proceeds to step S212. Otherwise, the flow returns to step S207.

In step S212, the calculator 101 causes the imaging control unit 107 to perform continuous imaging control over the optical imaging unit 106 to start continuous imaging. The calculator 101 causes the imaging control unit 107 to continuously perform continuous imaging control from step S212 to step S216.

Next, in step S213, the calculator 101 causes the imaging control unit 107 to perform AF control over the optical imaging unit 106 so as to keep tracking and focusing on the moving object.

Next, in step S214, the calculator 101 causes the three-dimensional space information acquiring unit 109 to acquire three-dimensional space information within the imaging angle of view, and determines whether or not an object exists within the imaging angle of view and within the continuous imaging area. The determination herein is made similarly step S210.

Next, in step S215, the calculator 101 proceeds to step S216 in a case where the calculator 101 determines in step S214 that the object exists within the imaging angle of view and within the continuous imaging area. Otherwise, the flow returns to step S213.

In step S216, the calculator 101 causes the imaging control unit 107 to end the continuous imaging control over the optical imaging unit 106.

Next, in step S217, similarly to step S206, the calculator 101 causes the imaging control unit 107 to perform AF control over the optical imaging unit 106 so as to focus on the center of gravity of the virtual object calculated in step S205.

Next, in step S218, the calculator 101 determines whether rearrangement of the virtual object has been selected by the user operation on the command input unit 108, and returns to step S202 in a case where rearrangement has been selected. On the other hand, in a case where rearrangement has not yet been selected, the flow proceeds to step S219.

In step S219, the calculator 101 determines whether or not termination of the automatic imaging mode has been selected by the user operation on the command input unit 108. In a case where termination has been selected, the flow proceeds to step S220. In a case where the termination has not yet been selected, the flow returns to step S207.

In step S220, the calculator 101 causes the image processor 102 to end the display of the LV image on the display unit 105.

By controlling AF and continuous imaging in automatic imaging using a virtual object, this embodiment can perform imaging that reflects the intention of the user.

Second Embodiment

A description will be given of an image pickup apparatus according to a second embodiment. Although one virtual object is disposed in the first embodiment, a plurality of virtual objects are disposed in the second embodiment. By arranging the plurality of virtual objects, AF control and continuous imaging control can be performed in a plurality of search areas separated from each other, and different AF control and continuous imaging control can be performed depending on the search areas. The hardware configuration of the image pickup apparatus of this embodiment is the same as that of the image pickup apparatus according to the first embodiment, and common elements will be designated by the same reference numerals as those of the first embodiment.

Figure 6A:
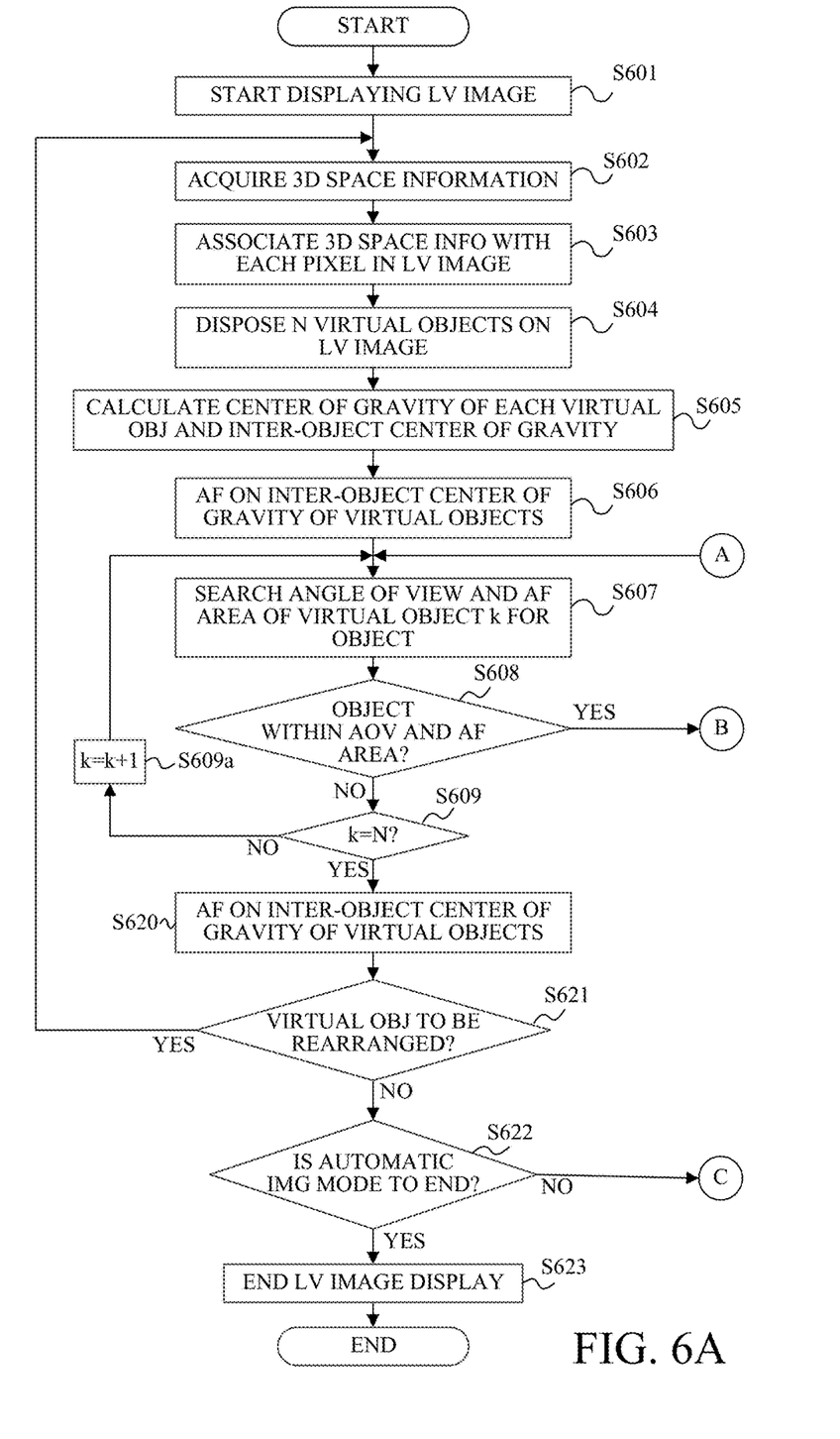
FIGS. 6A and 6B illustrate a flowchart of automatic imaging processing according to a second embodiment.
Figure 6B:
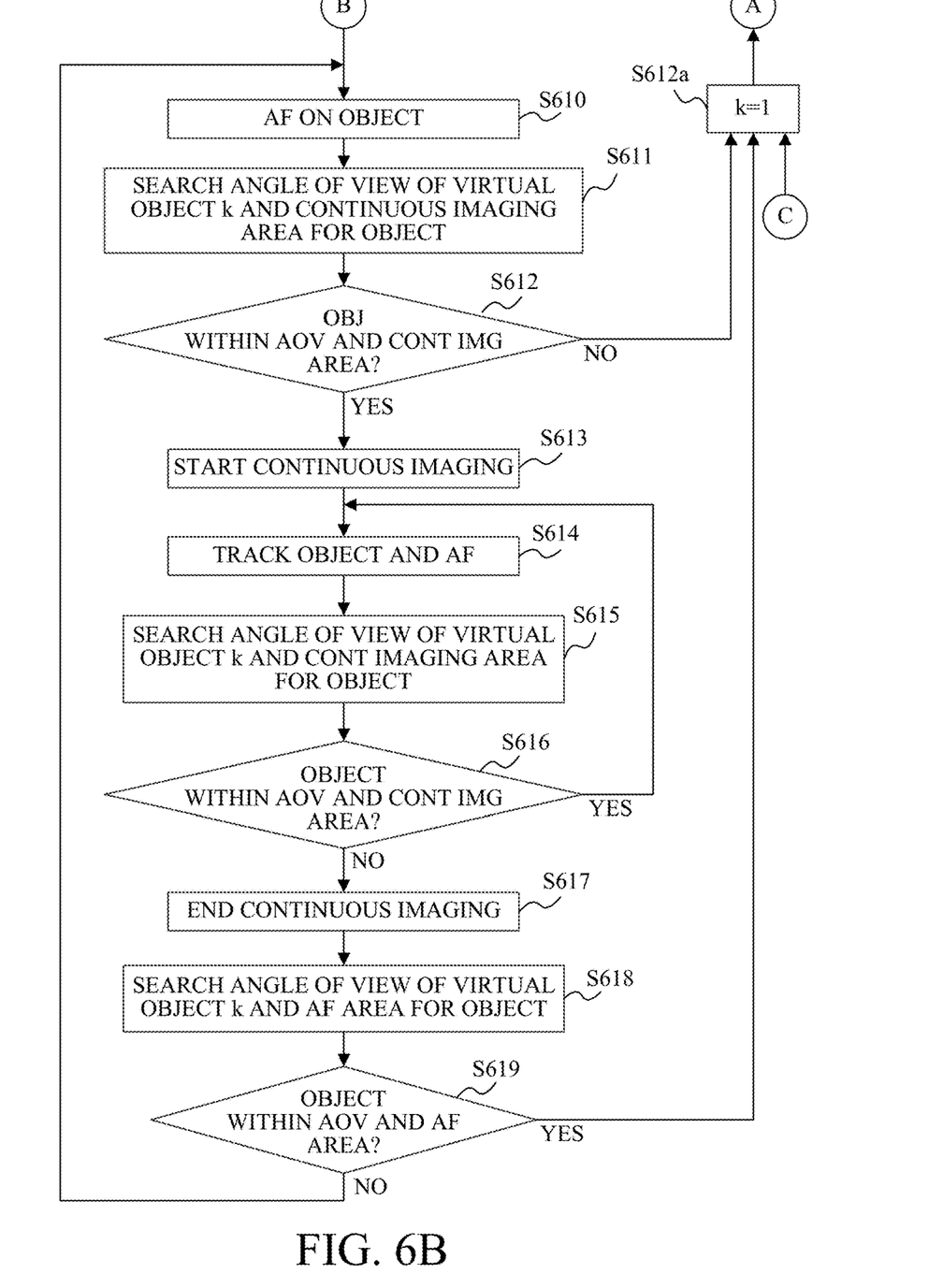

The flowcharts of FIGS. 6A and 6B illustrate automatic imaging processing executed by the calculator 101 according to this embodiment.

Step S601 to step S603 correspond to step S201 to step S203 in FIG. 2.

In step S604 next to step S603, the calculator 101 disposes N virtual objects (where N is a natural number equal to or larger than 1) on the LV image by the user operation of the touch panel of the command input unit 108 or the like. At this time, the N virtual objects are arranged so that the continuous imaging areas do not overlap each other. The method of arranging the virtual objects and the method of changing the size and position are similar to those described in step S204.

Next, in step S605, the calculator 101 calculates the coordinates of the center of gravity of each virtual object disposed in step S604. The calculator 101 calculates the center of gravity of all virtual objects (referred to as inter-object center of gravity hereinafter).

Figure 7:
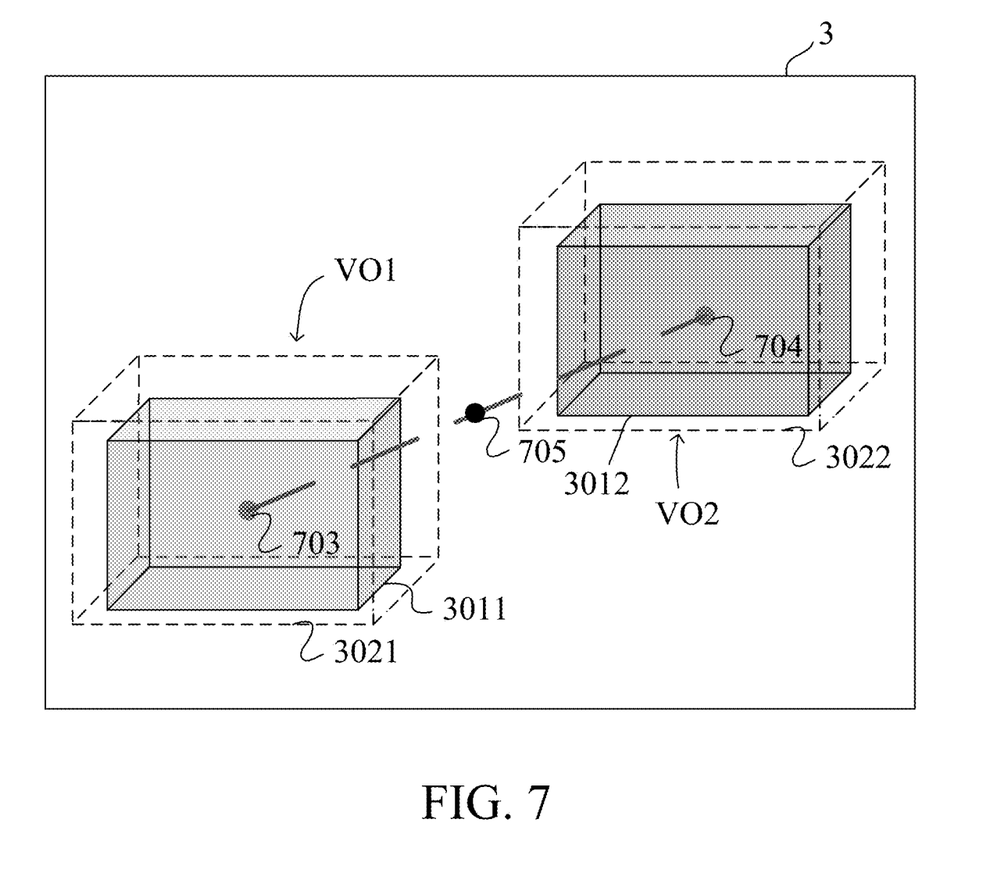
FIG. 7 illustrates a center of gravity of two virtual objects in the second embodiment.

FIG. 7 illustrates two virtual objects VO1 and VO2 disposed in the LV image 3. A search area including an AF area 3021 and a continuous imaging area 3011 is designated by the virtual object VOL and a search area including an AF area 3022 and a continuous imaging area 3012 is designated by the virtual object VO2. The virtual object VO1 has a center of gravity 703 and the virtual object VO2 has a center of gravity 704. An inter-object center of gravity 705 of the virtual objects VO1 and VO2 corresponds to a midpoint on a straight line connecting the center of gravity 703 and the center of gravity 704. In a case where three virtual objects are disposed, the inter-object center of gravity corresponds to a center of gravity of a triangle formed by connecting the centers of gravities of these three virtual objects.

Next, in step S606, the calculator 101 causes the imaging control unit 107 to perform AF control over the optical imaging unit 106 so as to focus on the inter-object center of gravity.

Next, in step S607, the calculator 101 causes the three-dimensional space information acquiring unit 109 to acquire three-dimensional space information within the imaging angle of view. Then, the calculator 101 determines whether or not an object exists within the imaging angle of view and within an AF area 302$k$ (corresponding to a virtual object k hereinafter) in a search area designated by the virtual object k that is a k-th (k=1, 2, . . . , N) virtual object. The determination method herein is similar to the determination method in step S207.

In step S608, in a case where the object exists within the imaging angle of view (AOV) and within the AF area 302$k$ corresponding to the virtual object k in step S607, the flow proceeds to step S610; otherwise, the flow proceeds to step S609.

In step S609, the calculator 101 determines whether or not k becomes equal to N. If so, the flow proceeds to step S620; otherwise, the flow returns to step S607 by incrementing k by 1 in step S609.

In step S610, the calculator 101 causes the imaging control unit 107 to perform AF control over the optical imaging unit 106 so as to focus on an object existing within the imaging angle of view and within the AF area 302$k$ corresponding to the virtual object k.

In step S611, the calculator 101 causes the three-dimensional space information acquiring unit 109 to acquire three-dimensional space information within the imaging angle of view. The calculator 101 determines whether or not an object exists within the imaging angle of view and within the continuous imaging area corresponding to the virtual object k. The determination herein is performed by a method in which the AF area in step S607 is replaced with a continuous imaging area.

In step S612, in a case where the calculator 101 determines in step S611 that the object exists within the imaging angle of view and within the continuous imaging area corresponding to the virtual object k, the flow proceeds to step S613. Otherwise, k is set to 1 in step S612$a$, and the flow returns to step S607.

In step S613, the calculator 101 causes the imaging control unit 107 to perform continuous imaging control over the optical imaging unit 106 to start continuous imaging. The calculator 101 causes the imaging control unit 107 to continuously perform continuous imaging control from step S613 to step S617.

Next, in step S614, the calculator 101 causes the imaging control unit 107 to perform AF control over the optical imaging unit 106 so as to keep tracking and focusing on the moving object.

Next, in step S615, the calculator 101 causes the three-dimensional space information acquiring unit 109 to acquire three-dimensional space information within the imaging angle of view, and determines whether an object exists within the imaging angle of view and within the continuous imaging area corresponding to the virtual object k. The determination herein is performed in a manner similar to that of step S611.

Next, in step S616, in a case where the calculator 101 determines in step S615 that the object exists within the imaging angle of view and within the continuous imaging area corresponding to the virtual object k, the calculator 101 returns to step S614. Otherwise, the flow proceeds to S617.

In step S617, the calculator 101 causes the imaging control unit 107 to end the continuous imaging control over the optical imaging unit 106.

Next, in step S618, the calculator 101 causes the three-dimensional space information acquiring unit 109 to acquire three-dimensional space information within the imaging angle of view, similarly to step S607. The calculator 101 determines whether or not an object exists within the imaging angle of view and within the AF area 302$k$ corresponding to the virtual object k.

Next, in step S619, in a case where the calculator 101 determines in step S618 that the object exists within the imaging angle of view and within the AF area 302$k$ corresponding to the virtual object k, the calculator 101 returns to step S610. Otherwise, k is set to 1 in step S612$a$, and the flow returns to step S607.

In step S620 next to step S609, the calculator 101 causes the imaging control unit 107 to perform AF control over the optical imaging unit 106 so as to focus on the inter-object center of gravity, similarly to step S606.

Next, in step S621, the calculator 101 determines whether rearrangement of the virtual object has been selected by the user operation on the command input unit 108, and returns to step S602 in a case where rearrangement has been selected. On the other hand, in a case where rearrangement has not yet been selected, the flow proceeds to step S622.

In step S622, the calculator 101 determines whether or not termination of the automatic imaging mode has been selected by the user operation on the command input unit 108, and in a case where termination has been selected, the flow proceeds to step S623. In a case where the termination has not yet been selected, the flow proceeds to step S612a to set k to 1, and the flow returns to step S607.

In step S623, the calculator 101 causes the image processor 102 to end the display of the LV image on the display unit 105.

Figure 8:
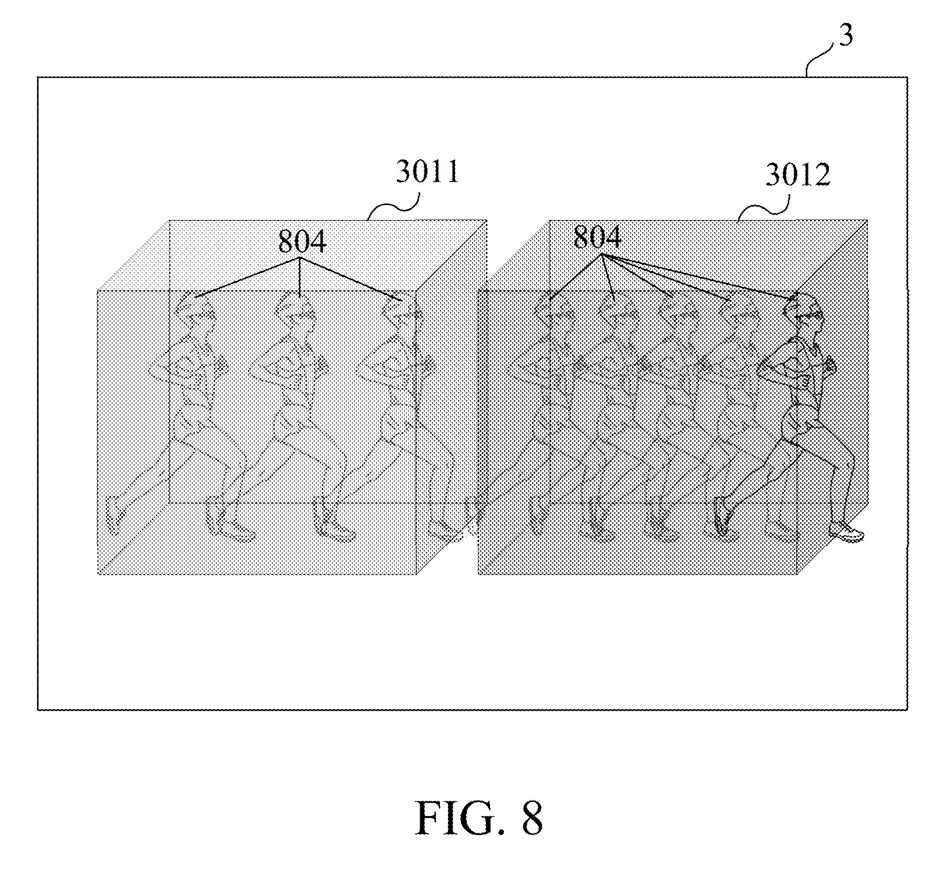
FIG. 8 illustrates different continuous imaging intervals in two virtual objects according to the second embodiment.

As illustrated in FIG. 8, in a case where a plurality of virtual objects are disposed in step S604, different continuous imaging intervals can be set for each continuous imaging area of the virtual objects. FIG. 8 illustrates an object 804 moving (passing) from left to right within continuous imaging areas 3011 and 3012 corresponding to two virtual objects set with continuous imaging intervals different from each other. In the continuous imaging area 3011, the continuous imaging interval is set wide (continuous imaging speed is slow), and in the continuous imaging area 3012, the continuous imaging interval is set narrower than that of the continuous imaging area 3011 (continuous imaging speed is fast). The position of the object 804 in FIG. 8 indicates the position of the object at each imaging timing in the continuous imaging. A difference in the continuous imaging interval between the continuous imaging areas 3011 and 3012 is recognized by the user by color and transparency in displaying the continuous imaging areas 3011 and 3012.

By controlling AF and continuous imaging in automatic imaging using a plurality of virtual objects, this embodiment can perform imaging that reflects the intention of the user.

In a case where a plurality of objects enter a search area (AF area and continuous imaging area) with a time difference, the first object that enters the search area first may be prioritized for AF control or continuous imaging. In this case, even if the second object enters the search area late between steps S610 and S619, AF control or continuous imaging control is not performed for the second object.

A priority may be set to each search area, and AF control and continuous imaging control may be preferentially performed for the first object that first enters the search area with a higher priority. In this case, the priority is set in a case where the virtual object is disposed in step S604 or in a case where the object does not exist in the search area in step S607. Between steps S610 and S619, in a case where the second object enters an virtual object search area with a higher priority than that of the search area of the first object, the AF control and continuous imaging control for the first object may be interrupted, and AF control or continuous imaging control may be performed for the second object that has entered the search area with the higher priority.

In a case where a plurality of virtual objects are disposed with a time difference, a higher priority may be set to a search area corresponding to a virtual object disposed earlier, or to a search area corresponding to a virtual object disposed later. A higher priority may be set to a search area corresponding to a virtual object disposed in front of the image pickup apparatus 1, or to a search area corresponding to a virtual object disposed behind the image pickup apparatus 1. The priority of each search area corresponding to a plurality of virtual objects may be set according to the selection of the user.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-126633, filed on Aug. 8, 2022, which is hereby incorporated by reference herein in its entirety.

What is claimed is:

1. A control apparatus configured to control imaging of an object, the control apparatus comprising:
   a memory storing instructions; and
   a processor configured to execute the instructions to:
   acquire information about three-dimensional space as an imaging target, and
   dispose a virtual figure in the three-dimensional space,
   designate a search area to search the three-dimensional space for the object based on the virtual figure, and
   perform at least one of focus control and continuous imaging control for the object existing within the search area.

2. The control apparatus according to claim 1, wherein the processor is configured to designate the search area inside or outside the three-dimensional space as the virtual figure.

3. The control apparatus according to claim 1, wherein the processor is configured to search for the object within the search area using information about the three-dimensional space.

4. The control apparatus according to claim 1, wherein the processor is configured to perform the focus control for the object existing within a focus area set inside the search area.

5. The control apparatus according to claim 1, wherein the processor is configured to perform the continuous imaging control for the object existing within a continuous imaging area set inside the search area.

6. The control apparatus according to claim 1, wherein the processor is configured to:
  perform the focus control for the object existing within a focus area set inside the search area, and
  perform the continuous imaging control for the object existing within a continuous imaging area set inside the focus area inside the search area or equally set to the focus area.

7. The control apparatus according to claim 1, wherein the processor is configured to:
  dispose a plurality of multiple virtual figures in the three-dimensional space, and
  designate the search area for each of the plurality of virtual figures.

8. The control apparatus according to claim 7, wherein the processor is configured to perform at least one of the focus control and the continuous imaging control by prioritizing one of search areas designated for the plurality of virtual figures over other search areas.

9. The control apparatus according to claim 8, wherein the processor is configured to set the one of search areas according to a selection of a user.

10. The control apparatus according to claim 7, wherein the processor is configured to perform the continuous imaging control at different continuous imaging intervals for search areas designated for the plurality of virtual figures.

11. The control apparatus according to claim 1, wherein the processor is configured to change a position and a size of the virtual figure in the three-dimensional space according to an operation of a user.

12. An image pickup apparatus comprising:
  the control apparatus according to claim 1; and
  an image sensor.

13. A control method configured to control imaging of an object, the control method comprising the steps of:
  acquiring information about three-dimensional space as an imaging target;
  disposing a virtual figure in the three-dimensional space;
  designating a search area to search the three-dimensional space for the object based on the virtual figure, and
  performing at least one of focus control and continuous imaging control for the object existing within the search area.

14. A non-transitory computer-readable storage medium storing a program that causes a computer to execute the control method according to claim 13.

* * * * *